United States Patent
Frank et al.

(10) Patent No.: US 6,933,634 B2
(45) Date of Patent: Aug. 23, 2005

(54) FAN BAFFLE

(75) Inventors: Peter L. Frank, Hamel, MN (US); Robert D. Cooper, Elk River, MN (US)

(73) Assignee: Wagner Spray Tech Corporation, Plymouth, MN (US)

(*) Notice: Subject to any disclaimer, the term of this patent is extended or adjusted under 35 U.S.C. 154(b) by 62 days.

(21) Appl. No.: 10/427,448

(22) Filed: May 1, 2003

(65) Prior Publication Data

US 2004/0217661 A1 Nov. 4, 2004

(51) Int. Cl.$^7$ .................................................. H02K 9/00
(52) U.S. Cl. .................................... 310/58; 310/64
(58) Field of Search .......................... 310/58, 59, 64

(56) References Cited

U.S. PATENT DOCUMENTS 3,829,721 A * 8/1974 Rosenthal, Jr. ............. 310/47
3,848,145 A * 11/1974 Goebel et al. ............ 310/60 R
5,006,743 A * 4/1991 King et al. .................... 310/89
5,714,819 A * 2/1998 Gilliland et al. .............. 310/91

* cited by examiner

Primary Examiner—Darren Schuberg
Assistant Examiner—Nguyen Hanh
(74) Attorney, Agent, or Firm—Faegre & Benson LLP

(57) ABSTRACT

An improved cooling arrangement for an electric motor in a pump assembly, including a resilient fan baffle having a planar main surface and a pair of wings extending perpendicularly out from the main surface to direct airflow away from the motor when the fan baffle is installed on the motor. A method of installing the fan baffle includes bending two ends of the periphery of the fan baffle to clear obstructions on the motor, and then releasing the ends to allow them to come together in a planar arrangement.

1 Claim, 11 Drawing Sheets

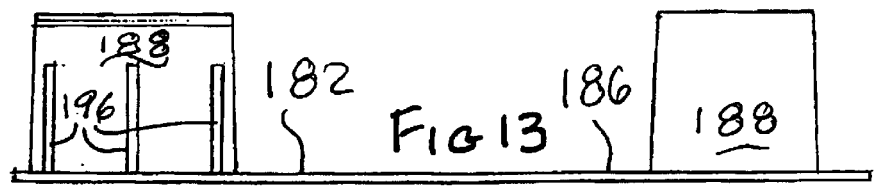
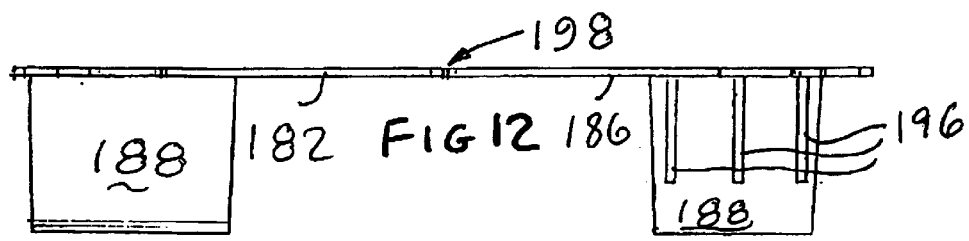
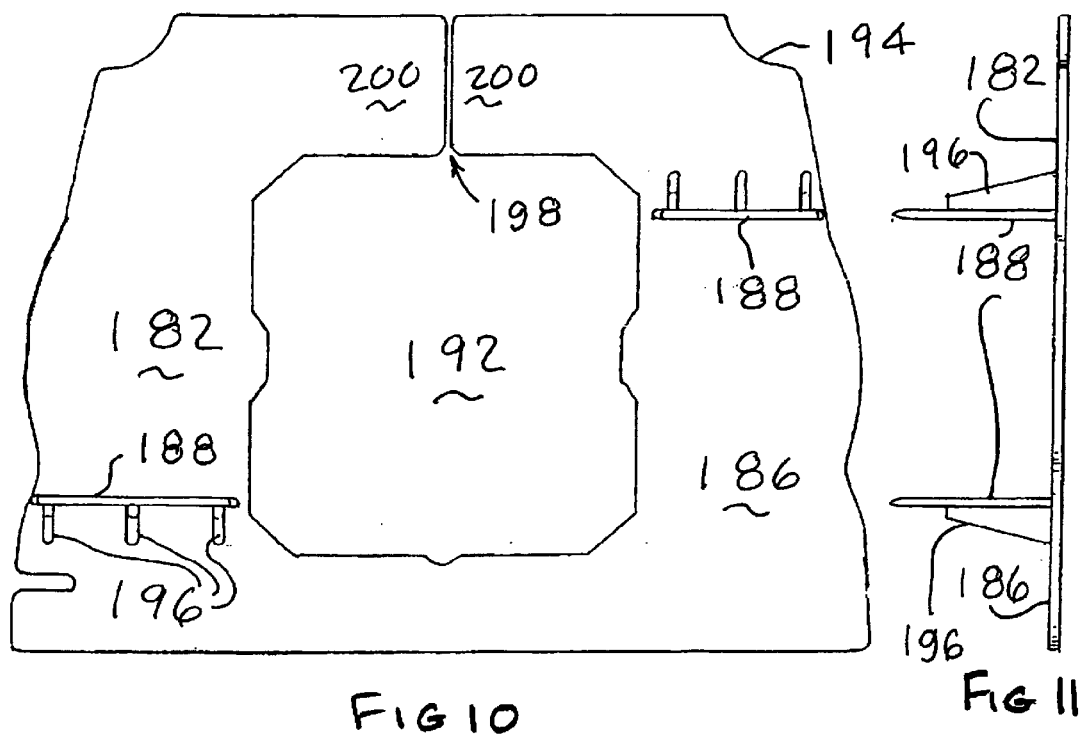

FAN BAFFLE

CROSS REFERENCE TO RELATED APPLICATIONS

Reference is made to the following copending and commonly assigned United States Patent Applications by the same inventors, each of which was filed on the same day as the instant application, and each of which is hereby expressly incorporated by reference:

i) STRAINER AND VALVE RELEASE, Ser. No. 10/427,446, filed May 1, 2003; and ii) IMPROVED SWASHPLATE PUMP, Ser. No. 10/427,447, filed May 1, 2003.

FIELD OF THE INVENTION

This invention relates to the field of pumps for paint and related coating materials, more particularly, to electric motor driven pumps for such applications.

BACKGROUND OF THE INVENTION

In the past, it has been known to provide sheet metal and other baffle plates and structures for directing air in electric motor driven equipment. Some baffle plates were commonly formed of one piece of planar material in the shape of a "C" and thus incompletely surrounded the parts they were adjacent to, and therefore incompletely directed air flow, or were of multiple pieces, requiring more parts and manipulation in assembly, with the consequent increase in cost and time to assemble, and potential for misassembly or incomplete assembly, where one or more pieces were omitted or incorrectly installed.

The present invention overcomes shortcomings of the prior art by providing a single, three dimensional baffle plate having a main surface substantially completely surrounding the motor when installed, and having a pair of "wings" projecting from the main surface to direct cooling air to outlets in the paint pump apparatus. The fan baffle of the present invention is formed of resilient material and has a radial cut from the outer periphery to an aperture in the main surface, enabling the fan baffle to be temporarily flexed out of plane for installation, after which the main surface is restored to a planar condition with the aperture closely surrounding the motor to more effectively direct cooling air flow with respect to the motor.

BRIEF DESCRIPTION OF THE DRAWINGS

FIG. 10 is a front view of the fan baffle useful in the practice of the present invention.

FIG. 11 is a side view of the fan baffle of FIG. 10.

FIG. 12 is a top view of the fan baffle of FIG. 10.

FIG. 13 is a bottom view of the fan baffle of FIG. 10.

DETAILED DESCRIPTION OF THE INVENTION

Figure 1:
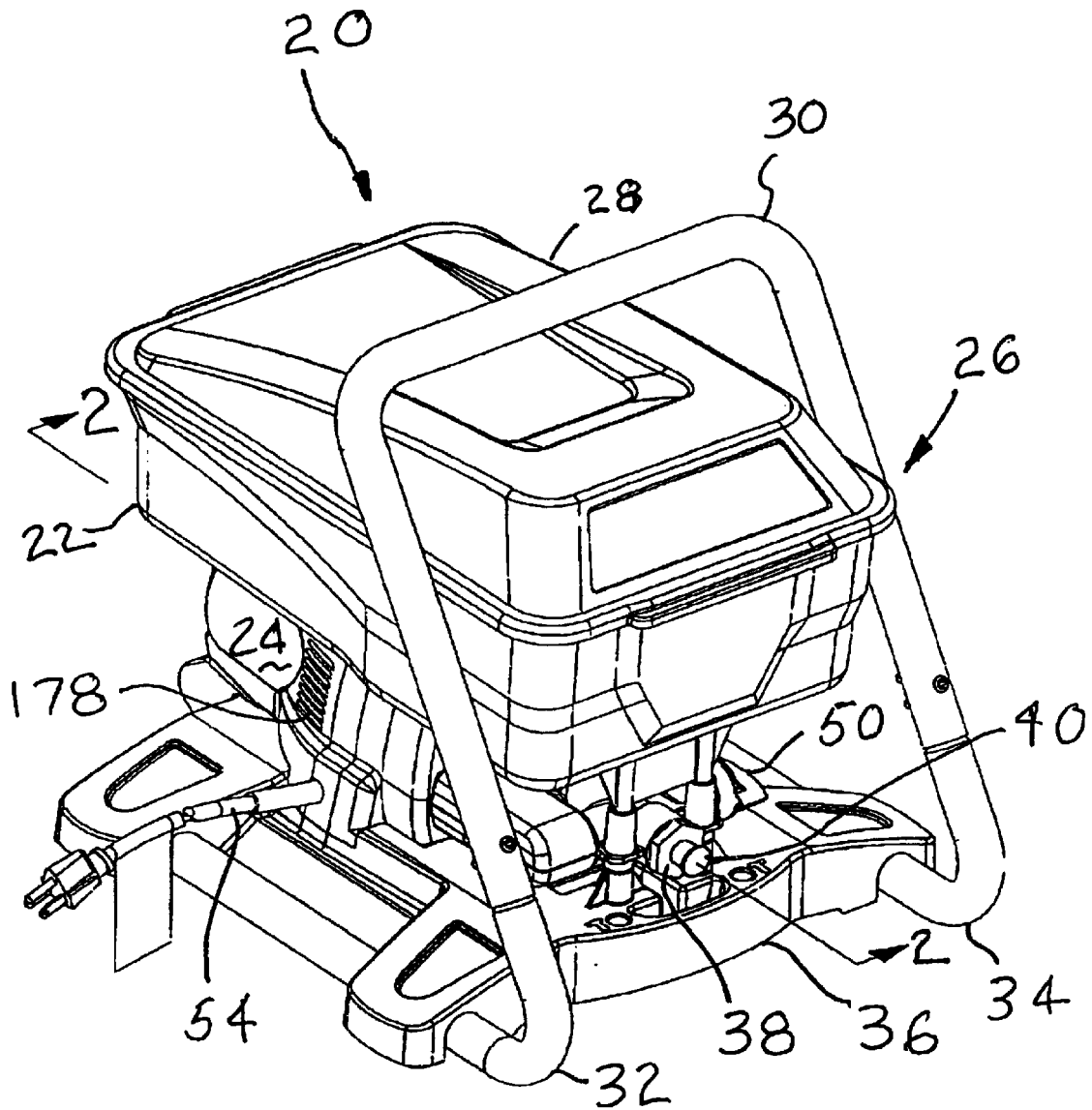
FIG. 1 is a perspective view of a paint pump apparatus useful in the practice of the present invention.
Figure 2:
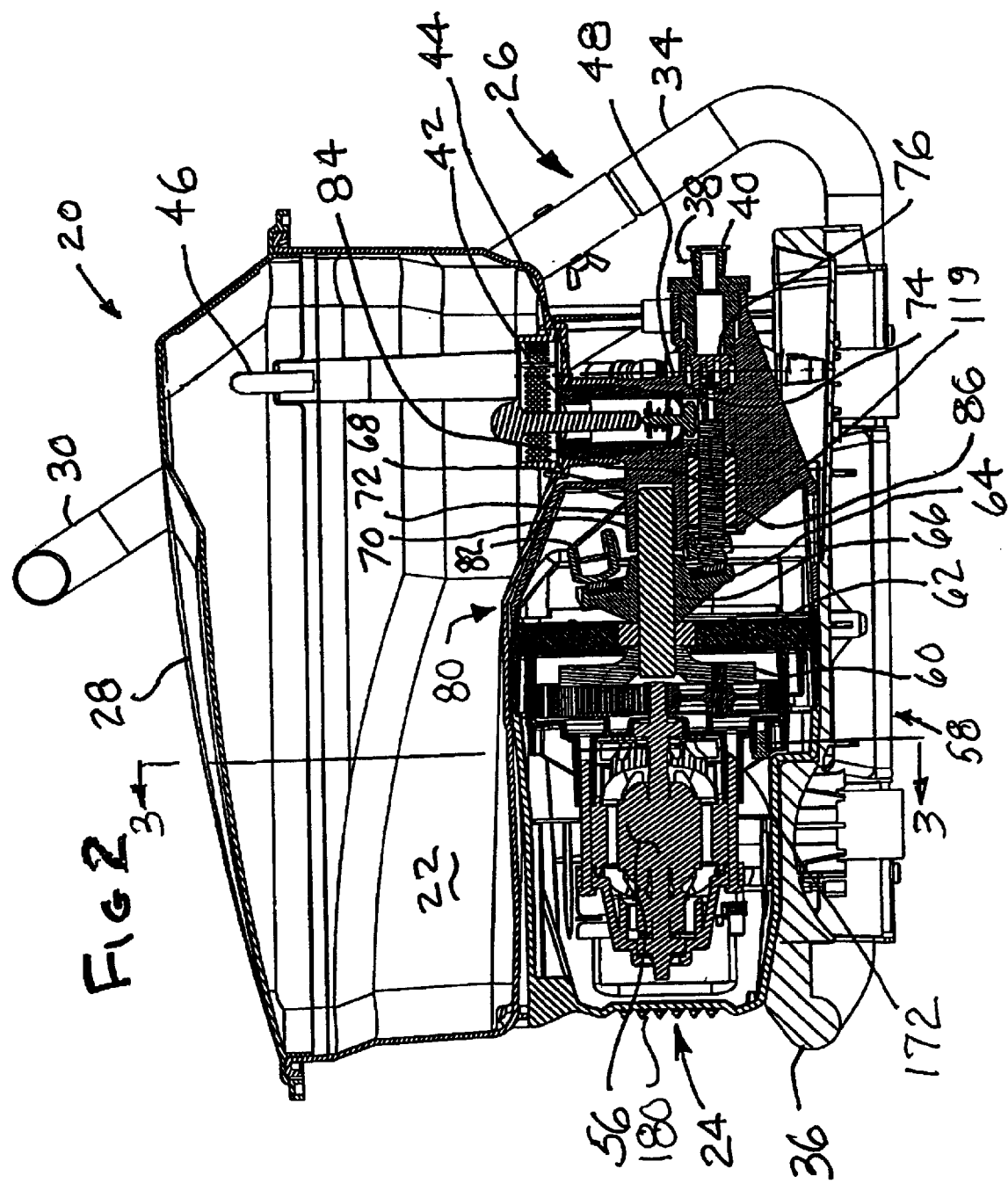
FIG. 2 is section view of the paint pump apparatus along line 2—2 of FIG. 1.
Figure 3:
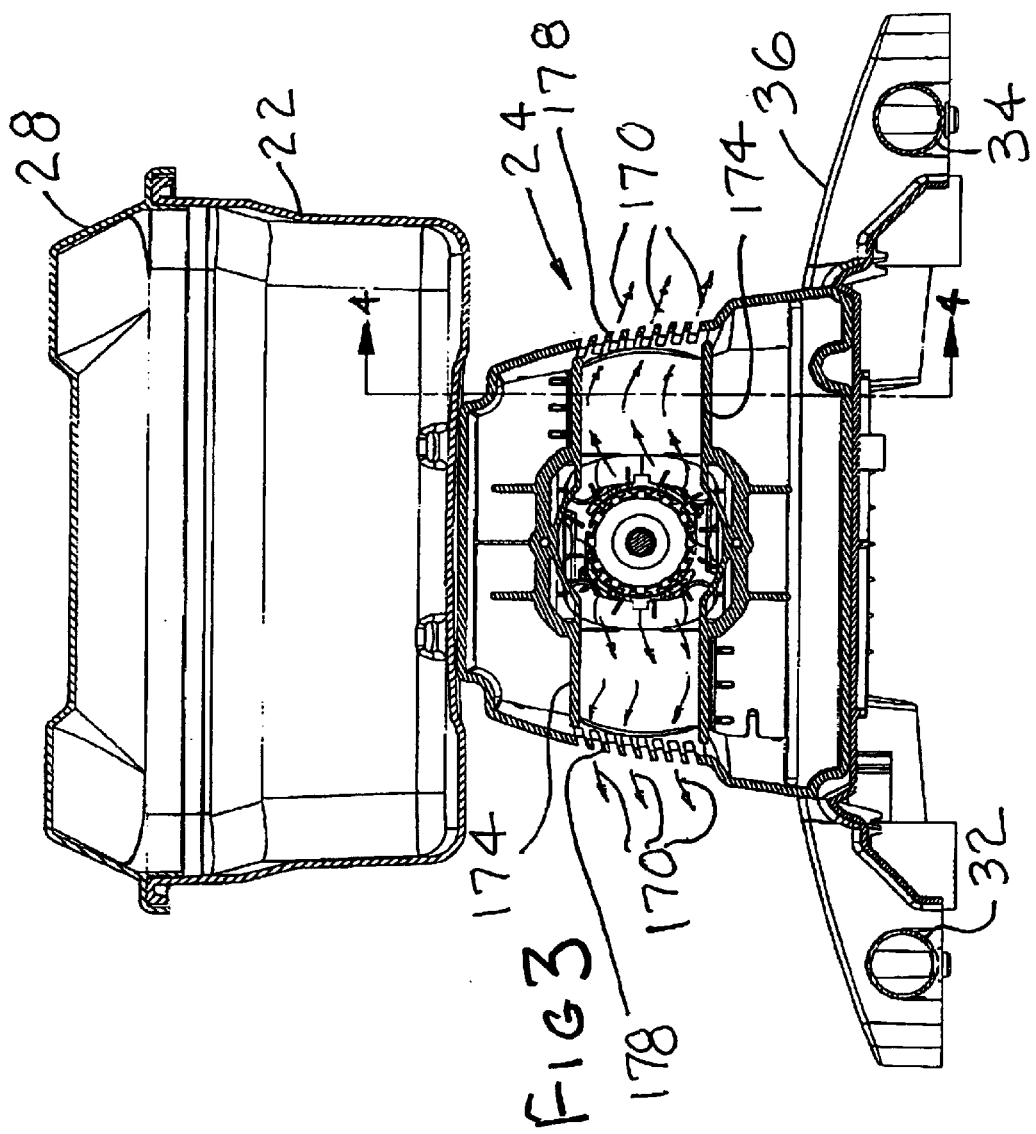
FIG. 3 is a section view of the paint pump apparatus along line 3—3 of FIG. 2.
Figure 4:
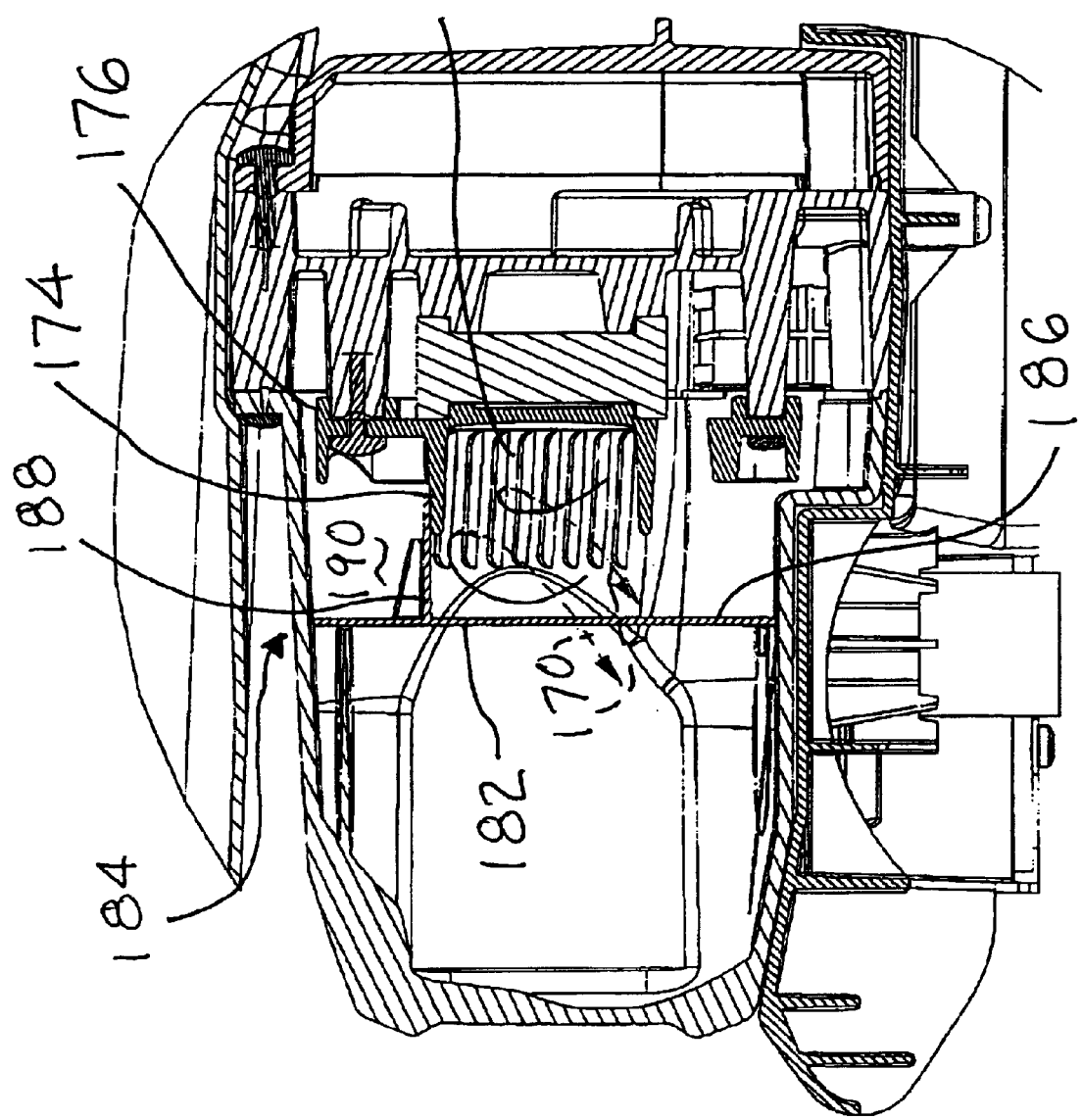
FIG. 4 is a fragmentary section view along line 4—4 of FIG. 3.
Figure 5:
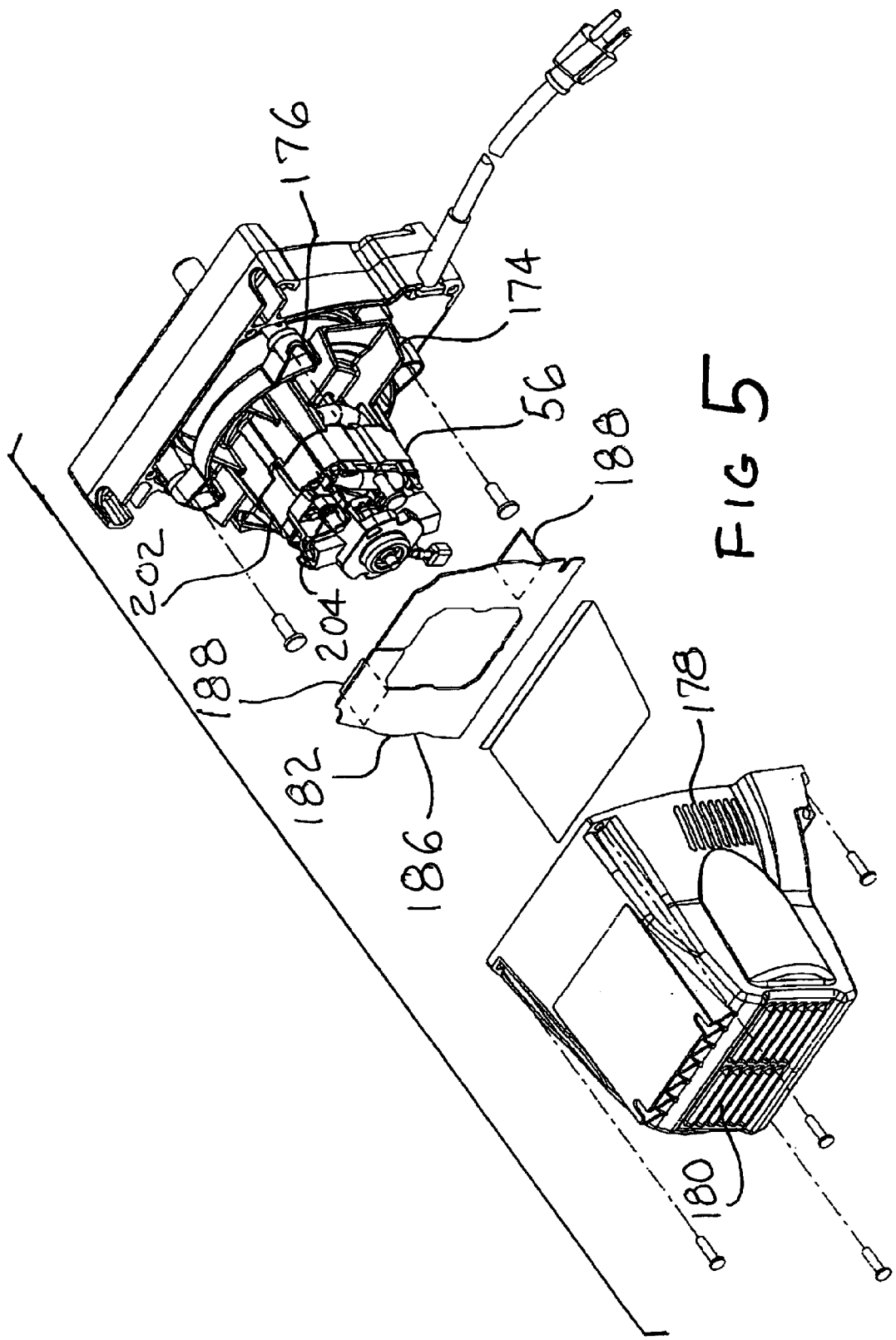
FIG. 5 is an exploded view of a portion of the paint pump assembly of FIG. 1 to illustrate the present invention.
Figure 6:
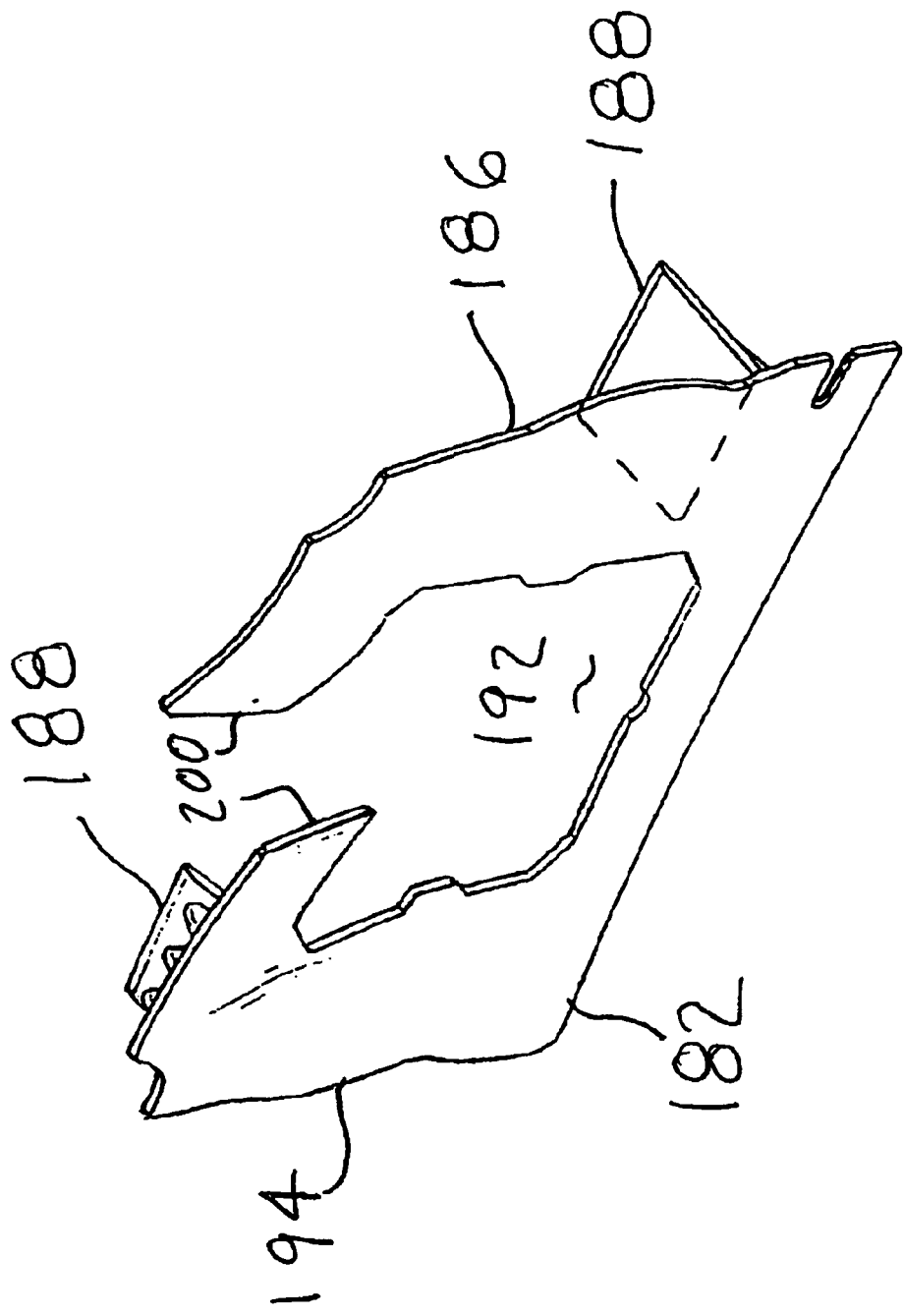
FIG. 6 is a view of the fan baffle of the present invention shown in a slightly deformed state preparatory to installation.
Figure 7:
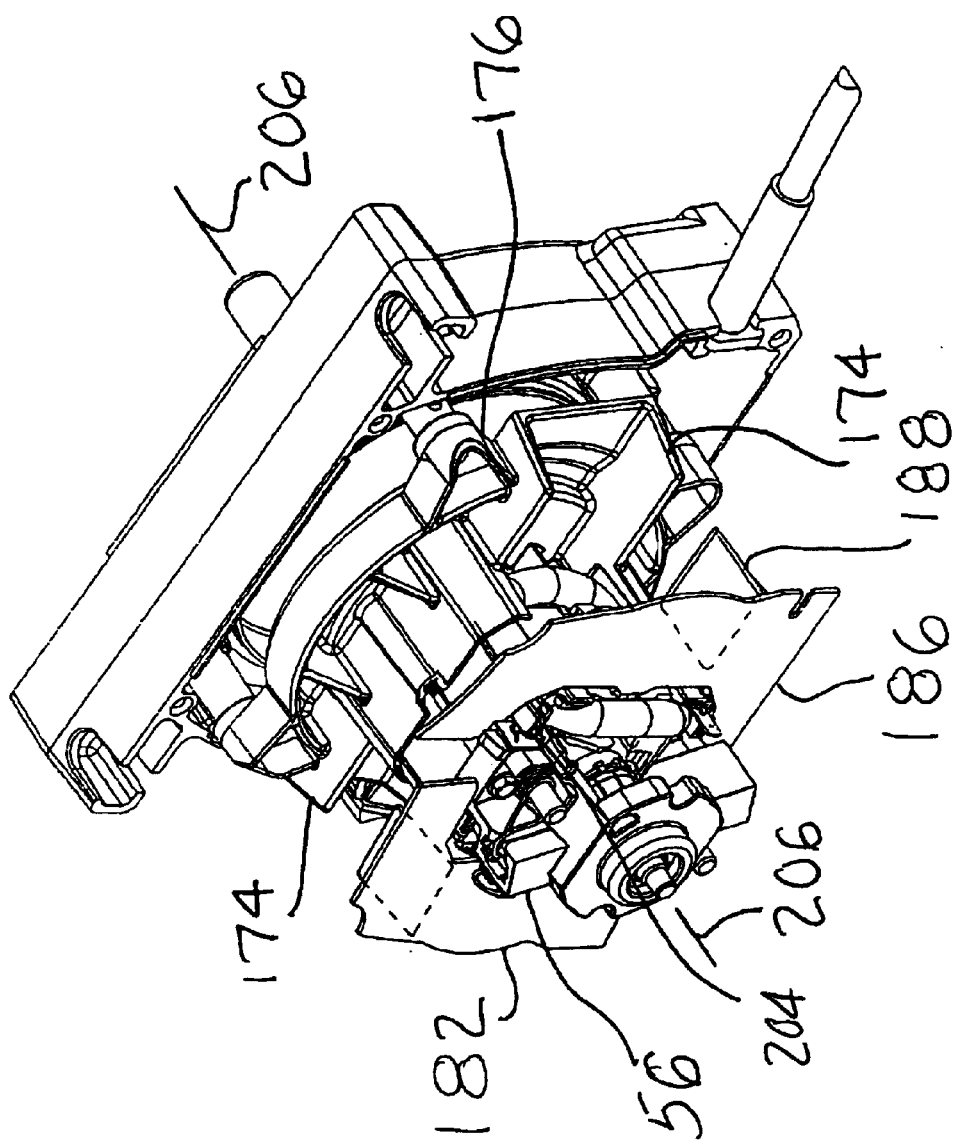
FIG. 7 is a view of a fan baffle shown in the process of being installed on a motor assembly in the practice of the present invention.
Figure 8:
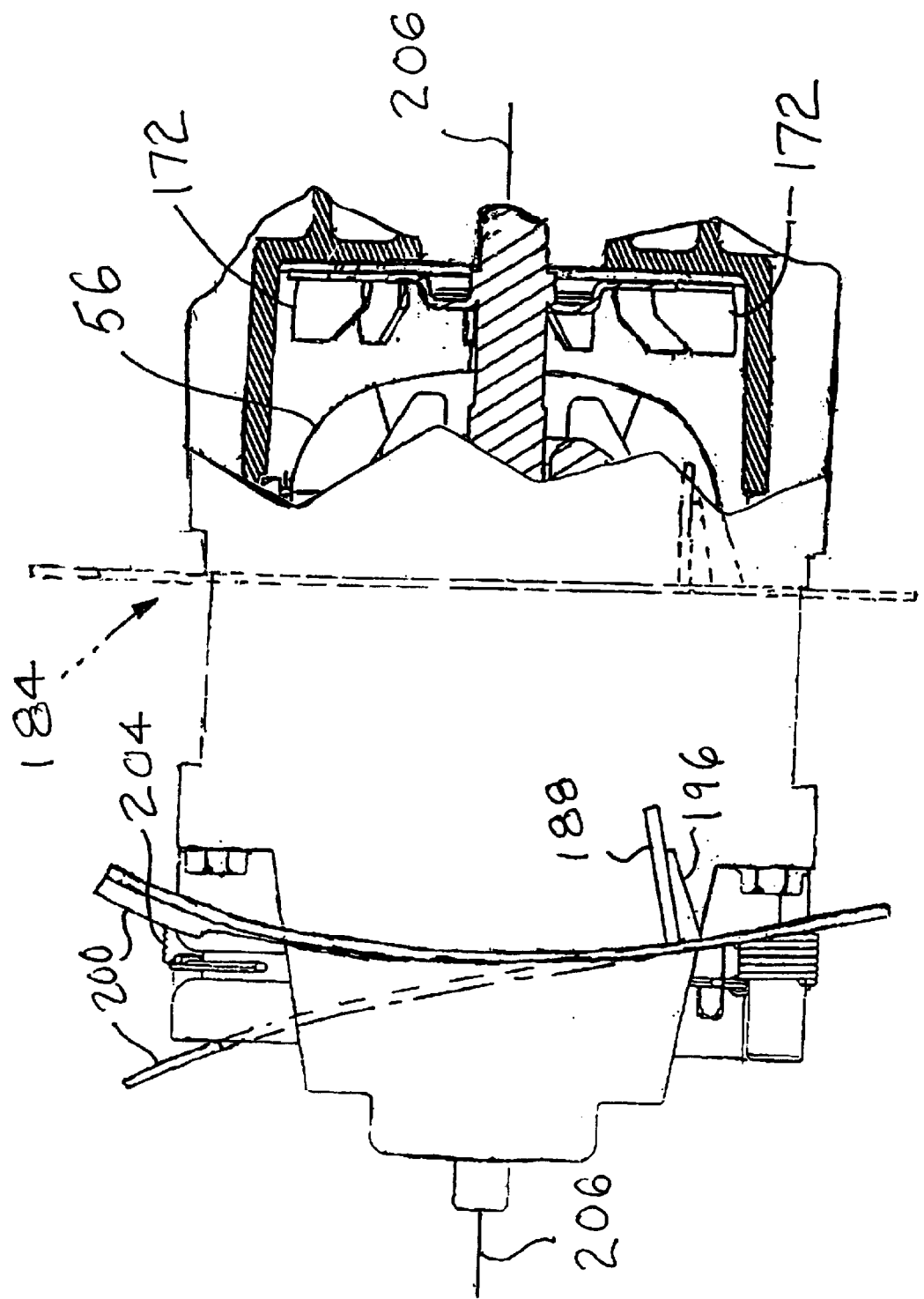
FIG. 8 is a simplified fragmentary diagram from the side illustrating installation of the fan baffle and showing certain details of a fan in the practice of the present invention.
Figure 9:
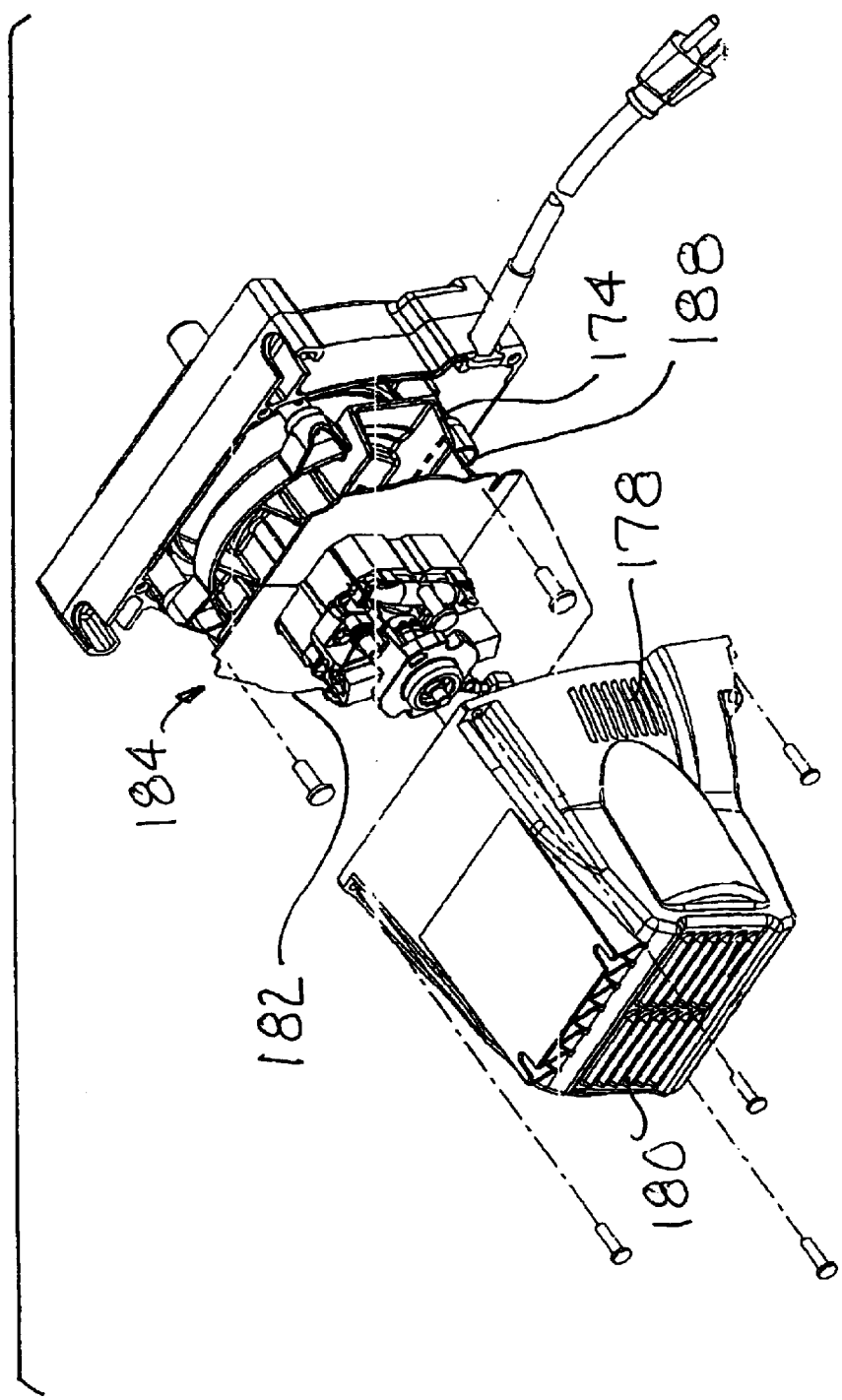
FIG. 9 is a view similar to that of FIG. 5, except with the fan baffle fully installed on the motor assembly.
Figure 14:
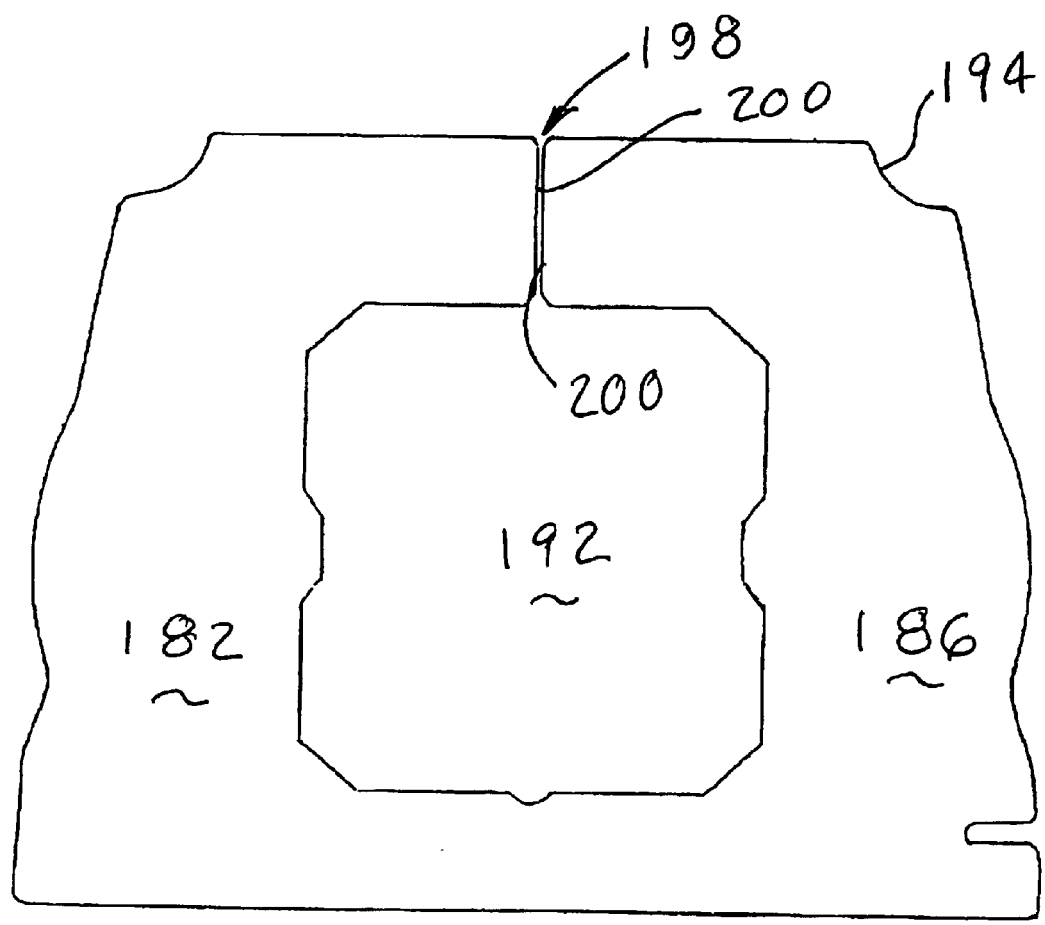
FIG. 14 is a rear view of the fan baffle of FIG. 10.

Referring to the Figures, and most particularly to FIGS. 1 and 2, a paint pump apparatus 20 useful in the practice of the present invention may be seen. Apparatus 20 is intended to pump paint and similar coatings at high pressure to a spray gun (not shown) for application to a surface to be coated via airless spraying.

Apparatus 20 includes a paint reservoir 22 and a pump assembly 24 carried by a frame 26. Reservoir 22 may have a cover 28. Frame 26 preferably has a handle portion 30 and a pair of foot portions 32, 34. Foot portions 32 and 34 are received in a base 36 which supports pump assembly 24. It is to be understood that a high pressure hose (not shown) is connected to an outlet 38 of the pump assembly 24 after a cap 40 is removed. The high pressure hose is also connected to an airless spray gun (not shown) for delivering paint or other coating material to a surface (not shown) desired to be coated. An inlet 42 of the pump assembly 24 is in fluid communication with reservoir 22, and sealed against leakage therebetween by one or more O-rings 44. It is to be understood that paint (or other similar coating material) is delivered by gravity from reservoir 22 to inlet 42 of the paint pump assembly 24. As is conventional, a return tube 46 is provided from a pump and valve housing 48 containing inlet 42 and outlet 38. Return tube 46 will return paint from the pump to the reservoir during a "priming" mode. A mechanical switch 50 enables transfer from the "priming" mode to a "run" mode wherein paint is delivered to the outlet 38 instead of the return tube 46. An ON-OFF electrical switch (not shown) enables power from a power cord 54 (when connected to electrical supply, not shown) to be delivered to an electric motor (not shown). The motor or another form of prime mover, such as a gasoline engine (also not shown) provides mechanical power for pump assembly 24 which includes a piston 84 axially reciprocating in a cylinder or pumping chamber 119. An inlet check valve 74 is positioned in inlet 42. Similarly an outlet check valve 76 is positioned in outlet 38.

Referring now most particularly to FIG. 2, a gear box 58 couples motor 56 to a spider 60 which is journalled for rotation in pump assembly 24 by a bearing 62 and provides direct drive to a swashplate 64 via a shaft 66 on which the spider 60 and swashplate 64 are rigidly mounted. A distal end 68 of shaft 66 is journalled for rotation in a pump assembly housing 70 by a bushing 72.

An inlet check valve 74 is positioned in inlet 42. Similarly an outlet check valve 76 is positioned in outlet 38. A swashplate assembly 80, which includes the spider 60, bearing 62 and swashplate 64 are all mounted on shaft 66. Assembly 80 also includes a rocker arm 82, a piston 84, a sleeve bearing 86, and a seal 88. In operation, swashplate 64 is rotated by motor 56 acting through gear box 58 and spider 60 when pump assembly 24 is to be operated, since swashplate 64 is carried on shaft 66. Rocker arm 82 is constrained in a congruent cavity in pump and valve housing 48, but is free to oscillate in a rocking motion when driven by rotation of swashplate 64. Reciprocation of piston 84 will draw paint into a pumping chamber 119 through inlet 42 and deliver paint under pressure via outlet 83.

Referring now most particularly to FIGS. 3, 4, 5, 7 and 8 details of the outlet air flow from motor 56 may be seen. Cooling air flow passes through motor 56 in a conventional manner, and exits radially from motor 56 as indicated by arrows 170 as propelled by a radial fan 172 (see FIGS. 2 and 8). Air is directed by channels 174 integrally formed with a housing 176 for gearbox 58, exiting via exhaust louvers 178. It is to be understood that motor cooling air is drawn into the motor 56 via inlet louvers 180.

Referring now to FIGS. 5–14, a fan baffle 182 is located at a mounting position 184 with respect to motor 56. Fan baffle 182 has a generally planar main surface 186 and preferably has a pair of wings 188 projecting from the main surface 186, preferably perpendicularly. Main surface 186 defines a plane and substantially completely surrounds the motor 56 when baffle 182 is installed. Once the fan baffle is installed, the motor has a cooling air inlet located upstream of the fan baffle, and the fan 172 located downstream of the fan baffle for drawing cooling air axially through the motor 56, because the main surface of the fan baffle closely interfits with the motor and main surface 186 and wings direct cooling air radially away from the motor and through the channels 174 toward exhaust louvers or outlet 178. Fan baffle is preferably formed of VO rated polypropylene. The main surface 186 is preferably 0.060 inches thick, and the wings 188 are preferably 0.060 inches thick, and extend a distance of about 1 1/16 inches away from main surface 186. It is to be understood that wings 188 in effect "complete" or extend channels 174, by assisting in directing cooling air leaving the motor to be directed to louvers 178. Only one wing is needed per side, because the motor 56 rotates in only one direction. Each wing is located on the downwind side of the channel with which it is associated. As may be seen most clearly in FIG. 4, if wing 188 were absent, air would be free to flow up into compartment 190 instead of being directed to louvers 178.

Fan baffle 182 has a centrally located aperture 192 sized and shaped to closely interfit with the motor 56 when the fan baffle is in the mounting position 184. Fan baffle 182 also has an outer periphery 194 and a narrow slit 198 extending from the periphery 194 to the aperture 192, forming separate ends 200 of the periphery of the fan baffle 182. Wings 188 each preferably have a plurality of gussets 196 to provide structural rigidity and stability.

The fan baffle 182 may be installed on the electric motor 56 by positioning the fan baffle adjacent an end of the motor, where the fan baffle is formed of a resilient material and has the aperture 192 in the fan baffle closely matching a first characteristic cross section 202 (FIG. 5) of the motor 56, with the first characteristic cross section of the motor located at a mounting position 184 (FIG. 8) for the fan baffle 182. The fan baffle is preferably moved over a first projection 204 of the motor by deforming the adjacent, but separate ends 200 of the periphery 194 of the fan baffle where the ends are formed by the narrow slit 198 in the fan baffle extending from the periphery of the fan baffle to the aperture, and moving the ends 200 of the periphery of the fan baffle past at least the first projection 204 on the motor having a characteristic cross section dimension greater than the first characteristic cross section 202 of the motor and releasing the ends 200 of the periphery of the fan baffle once they are moved past the first projection 204. The installation of the fan baffle is completed by positioning the fan baffle 182 at the mounting position 184. The first projection 204 is, in this case, a portion of a brush holder for the motor, but it is to be understood than any projection may be overcome with the method described above, while achieving a close interfit of the fan baffle with the motor upon installation.

The method described above is particularly advantageous when the fan baffle has a generally planar main surface 186 and the method includes moving the ends 200 out of the plane of the main surface 186 In such case, the method further includes allowing the ends of the periphery to move to a position adjacent each other and generally in a plane of the main surface of the fan baffle upon installation of the fan baffle.

The method of installation of the fan baffle is preferably performed by moving the fan baffle along the motor with the main surface 186 generally perpendicular to an axis 206 of the motor 56 until the fan baffle 182 is at the mounting position 184.

This invention is not to be taken as limited to all of the details thereof as modifications and variations thereof may be made without departing from the spirit or scope of the invention.

What is claimed is:

1. A fan baffle for an electric motor driving a pump for delivering paint and related coatings under pressure, the fan baffle comprising a single, three dimensional baffle plate formed of resilient material and having:

a generally planar main surface including an outer periphery surrounding the main surface, a generally centrally located aperture in the main surface, and a generally radially oriented slit extending from the outer periphery to the aperture permitting the fan baffle to be temporarily flexed out of plane for installation, after which the main surface is restored to a generally planar condition with the aperture closely surrounding the motor.

* * * * *